United States Patent
Chen et al.

(10) Patent No.: US 7,876,394 B2
(45) Date of Patent: Jan. 25, 2011

(54) POSITIONING APPARATUS FOR PREVENTING DEFORMATION OF DIFFUSER PLATE OF THE BACKLIGHT ASSEMBLY

(75) Inventors: Mei-Ying Chen, Tainan Science-Based Industrial Park (TW); Pei-Jung Wu, Tainan Science-Based Industrial Park (TW)

(73) Assignee: Chimei Innolux Corporation, Miao-Li County (TW)

( * ) Notice: Subject to any disclaimer, the term of this patent is extended or adjusted under 35 U.S.C. 154(b) by 584 days.

(21) Appl. No.: 11/070,243

(22) Filed: Mar. 3, 2005

(65) Prior Publication Data

US 2006/0012730 A1 Jan. 19, 2006

(30) Foreign Application Priority Data

Jul. 13, 2004 (TW) .............................. 93120910 A (51) Int. Cl.
G02F 1/1333 (2006.01)
G02F 1/1335 (2006.01)
F21V 7/04 (2006.01)

(52) U.S. Cl. ........................... 349/64; 349/58; 362/634

(58) Field of Classification Search ............. 349/58–71, 349/112; 362/600–634, 31, 26–27, 559, 362/581; 385/146, 901; 361/681
See application file for complete search history.

(56) References Cited

U.S. PATENT DOCUMENTS

| | | | | |
|---|---|---|---|---|
| 4,943,689 | A * | 7/1990 | Siefer et al. .............. 178/18.11 |
| 5,187,225 | A | 2/1993 | Kitagawa .................... 524/847 |
| 6,120,858 | A | 9/2000 | Hirano et al. ................... 428/1 |
| 6,357,763 | B2 | 3/2002 | Mathew et al. ............... 277/628 |
| 6,492,700 | B1 | 12/2002 | Lin et al. ...................... 257/435 |
| 6,552,769 | B2 | 4/2003 | Cho et al. ..................... 349/153 |
| 6,593,993 | B1 | 7/2003 | Jun |
| 6,642,992 | B2 | 11/2003 | Kim ............................ 349/191 |
| 6,646,709 | B2 | 11/2003 | Matsumoto ................. 349/156 |
| 6,824,287 | B2 * | 11/2004 | Moon ........................... 362/84 |
| 6,947,104 | B2 * | 9/2005 | Yu et al. ........................ 349/61 |
| 6,974,221 | B2 * | 12/2005 | Wu et al. ....................... 362/29 |
| 7,070,313 | B2 * | 7/2006 | Kim et al. .................... 362/561 |
| 7,118,263 | B2 * | 10/2006 | Tsai et al. .................... 362/558 |
| 7,134,776 | B2 * | 11/2006 | Kanatsu ....................... 362/561 |
| 2002/0044437 | A1 * | 4/2002 | Lee ............................... 362/31 |
| 2004/0120161 | A1 * | 6/2004 | Hwang ........................ 362/558 |

(Continued)

FOREIGN PATENT DOCUMENTS

JP 07-064084 3/1995

(Continued)

Primary Examiner—David Nelms
Assistant Examiner—Jessica M Merlin
(74) Attorney, Agent, or Firm—Thomas, Kayden, Horstemeyer & Risley (57) ABSTRACT

A positioning apparatus, used in the backlight assembly of display panel for preventing deformation of the diffuser plate, at least comprises a supporting object and an adhesive. The supporting object has a pillar, a sustaining portion and a fixing portion, wherein the sustaining portion and the fixing portion are respectively connected to the ends of the pillar. The adhesive is glued to the top of the sustaining portion of the supporting object. The diffuser plate, positioned at the top of the sustaining portion, is pulled by the adhesive, so that deformation of diffuser plate caused by the thermal and moisture shock can be effectively prevented.

24 Claims, 7 Drawing Sheets

U.S. PATENT DOCUMENTS

| | | | |
|---|---|---|---|
| 2004/0156185 A1* | 8/2004 | Wu | 362/31 |
| 2004/0201805 A1* | 10/2004 | Nishikouji et al. | 349/117 |
| 2005/0041411 A1* | 2/2005 | Wu | 362/31 |
| 2005/0219431 A1* | 10/2005 | Chang et al. | 349/40 |
| 2005/0225992 A1* | 10/2005 | Idei et al. | 362/382 |
| 2005/0243238 A1* | 11/2005 | Cha et al. | 349/58 |

FOREIGN PATENT DOCUMENTS

| | | | |
|---|---|---|---|
| JP | 09/113886 | | 2/1997 |
| JP | 2004039476 A | * | 2/2004 |
| TW | 519055 | | 1/2003 |
| TW | 566666 | | 12/2003 |

* cited by examiner

POSITIONING APPARATUS FOR PREVENTING DEFORMATION OF DIFFUSER PLATE OF THE BACKLIGHT ASSEMBLY

This application claims the benefit of Taiwan application Serial No. 093120910, filed Jul. 13, 2004, the subject matter of which is incorporated herein by reference.

BACKGROUND OF THE INVENTION

1. Field of the Invention

The invention relates in general to a positioning apparatus disposed in the direct bottom type backlight assembly, and more particularly to the positioning apparatus for preventing deformation of a diffuser plate of the direct bottom type backlight assembly.

2. Description of the Related Art

With the advantages of handy size, light weight, low power consumption and no radiation contamination, the liquid crystal displays ("LCD") whose display effect is much superior to that of a cathode ray tube display (CRT display) has attracted the public interest in recent years. A liquid crystal display comprises a display unit, a backlight unit, and a housing with a frame. The display unit comprises a display panel, a printed circuit board (PCB) capable of dealing with data signals, and a tape carrier package (TCP).

The backlight assembly is disposed under the display unit, for providing the light to the display unit uniformly. According to the light providing way, the backlight assemblies are divided into the edge light type and direct bottom type. Typically, a product of 20-inch size or less use linear light source (ex: Cold Cathode Fluorescent Lamp, CCFL, 2-8 of lamps in general) or spot light source (ex: Light-Emitting Diode, LED) disposed at the edge of the backlight assembly. Also, a light guiding plate and a plurality of diffusion sheets (optical sheets for enhancing the light) are used for increasing uniformity of light and lighting efficiency. Since LCD TV has a great demand on the brightness and the viewing angle, direct bottom type backlight assembly is widely applied in LCD TVs and the products of large size LCD monitors. Although the lamps required in the direct bottom type backlight assembly are more than that in the edge light type backlight assembly, light of the direct bottom type backlight assembly emits directly from the bottom of the assembly, and is uniformed by the diffuser plate (and diffusion sheets) without the light guiding plate. Thus, the direct bottom type backlight assembly comprises less backlight components.

Figure 1:
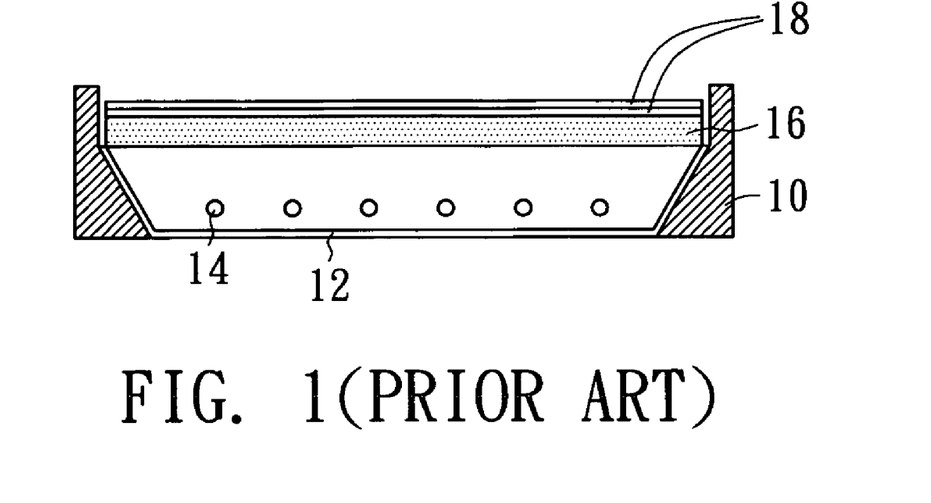
FIG. 1 (prior art) is a sectional view of a conventional direct bottom type backlight assembly.

FIG. 1 is a sectional view of a conventional direct bottom type backlight assembly. The direct bottom type backlight assembly at least comprises a housing 10, a reflective plate 12, the light sources 14, a diffuser plate 16 and a plurality of diffusion sheets 18. The linear light sources (for example, U-shaped lamp) 14 are arranged inside the housing 10, and the linear light is converted to planar light by the diffuser plate 16 and the diffusion sheets 18. The reflective plate 12 (for example, an aluminum plate) mounted on the bottom surface of the housing 10 is used to reflect light to the light output surface so as to improve the efficiency of the light. After the backlight assembly is completed, it is assembled with the display unit to establish a liquid crystal display (LCD).

The diffuser plate is commonly made of polymethyl methacrylate (PMMA), molybdenum disulfide (MS) or polycarbonate (PC). PMMA and MS possess better optical characteristics and anti-UV effect than PC; besides, PMMA and MS are much cheaper than PC. However, PC has a much better performance at the resistance of moisture shock. Under the environment of high temperature and high humidity, the diffuser plate made of PMMA or MS is moisture-retentive and bend easily. Therefore, the deformed diffuser plate interferes with display panel and causes the bad effect, so called as "pooling phenomena" on the display panel. Although the PC plate is moisture-resistant, the color of PC plate is easy to degrade (i.e. turn yellow), and the price of PC plate is much expensive than the PMMA plate and the MS plate.

Figure 2:
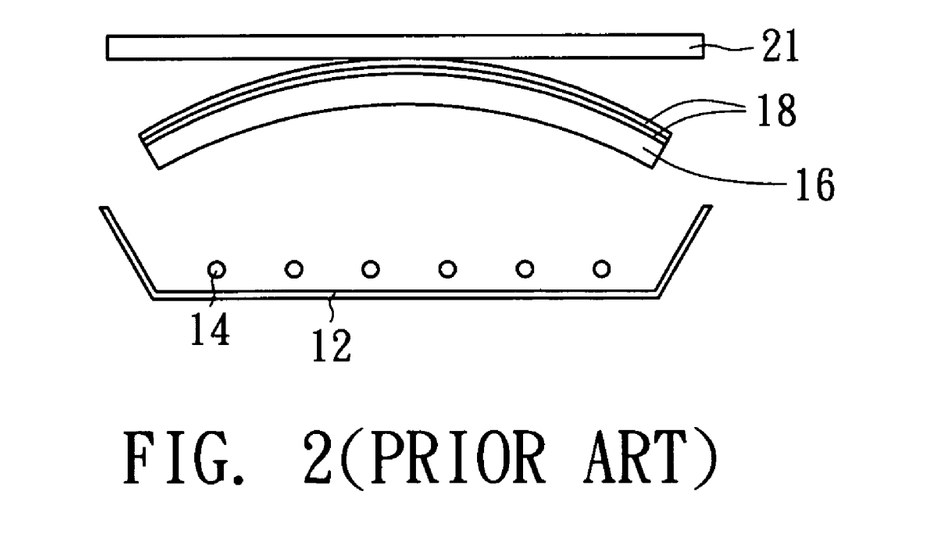
FIG. 2 (prior art) illustrates deformation of diffuser plate of FIG. 1 after moisture shock.

FIG. 2 illustrates deformation of diffuser plate of FIG. 1 after moisture shock. The housing of FIG. 1 is eliminated herein. The bottom surface (i.e. the surface close to the light sources 14) of the diffuser plate 16 is directly heated by the light source 14, while the top surface (i.e. the surface adjacent to the display panel 21) of the diffuser plate 16 is not. Therefore, the evaporation rate of the bottom surface of the diffuser plate 16 is faster than that of the top surface of the diffuser plate. The difference between the evaporation rate of the bottom surface and the evaporation rate of the top surface causes the diffuser plate 16 to bend toward the display panel 21. Generally, a gap with a predetermined distance is arranged between the diffuser plate 16(/diffusion sheets 18) and the display panel 21, to provide a space for the deformed diffuser plate 16. After moisture shock, however, if the maximum deformation of the diffuser plate 16 is more than the distance space of the gap, the diffuser plate 16 presses against the display panel 21 and the pooling phenomena appears on the display image with the position corresponds to the touch point of the diffuser plate 16 to the display panel 21, this affects the display performance.

One of the common solutions is to attach the diffuser plate 16 to the housing by two-side adhesive tape, for maintaining the evenness of the diffuser plate 16. However, this conventional solution has the drawbacks such as difficult to assemble the diffuser plate 16 and the housing (for example, hard to attach the two-side adhesive tape at the tiny frame of the housing), and increase of the cost (i.e. labor cost for attaching the tape). Another one of the common solutions is to configure the grooves for positioning the diffuser plate 16; however, the diffuser plate 16 with a large suspending area absorbs moisture so as to cause considerable deformation especially at the center of the diffuser plate 16. If the diffuser plate 16 presses against the display panel due to the deformation, as shown in FIG. 2, the pooling phenomenon will appears on the display image. In the practical application, the gap (i.e. distance between the diffuser plate and the display panel) is determined according to the deformation degree of the diffuser plate. The larger the deformation degree, the wider the gap and the thicker the LCD.

Accordingly, it would be desirable to reduce the deformation degree of the diffusion plate during the thermal shock and moisture shock, so as to produce a product as thin as possible.

SUMMARY OF THE INVENTION

It is therefore an object of the invention to provide a positioning apparatus for preventing deformation of a diffuser plate of the direct bottom type backlight assembly. After thermal or moisture shock, the deformation of the diffuser plate can be controlled in a small range due to sustentation of the positioning apparatus, thereby preventing appearance of pooling phenomenon on the display image.

The invention achieves the objects by providing a positioning apparatus disposed in a backlight assembly. The backlight assembly has a diffuser plate. The positioning apparatus comprises a supporting object and an adhesive. The supporting object comprises a pillar, a sustaining portion and a fixing portion, wherein the sustaining portion and the fixing portion are respectively connected to the ends of the pillar. The diffuser plate is positioned above the sustaining portion of the supporting object, and the adhesive is added on a top of the sustaining portion of the supporting object for pulling the diffuser plate.

The invention achieves the objects by providing a display device at least comprising a display panel and a backlight assembly. The backlight assembly comprises a housing, for positioning several backlight components of the backlight assembly, and the housing having a frame; and a diffuser plate, disposed on the frame, and a positioning apparatus disposed in the housing of the backlight assembly used for reducing deformation of the diffuser plate. The positioning apparatus at least comprises a supporting object and an adhesive. The supporting object comprises a pillar, a sustaining portion and a fixing portion, wherein the sustaining portion and the fixing portion are respectively connected to the ends of the pillar. The diffuser plate is positioned above the sustaining portion of the supporting object, and the adhesive is added on a top of the sustaining portion of the supporting object for pulling the diffuser plate.

Other objects, features, and advantages of the invention will become apparent from the following detailed description of the preferred but non-limiting embodiments. The following description is made with reference to the accompanying drawings.

DETAILED DESCRIPTION OF THE INVENTION

The embodiment disclosed herein is for illustrating the invention, but not for limiting the scope of the invention. Additionally, the drawings used for illustrating the embodiment of the invention only show the major characteristic parts in order to avoid obscuring the invention. Accordingly, the specification and the drawing are to be regard as an illustrative sense rather than a restrictive sense.

Positioning Apparatus

Figure 3A:
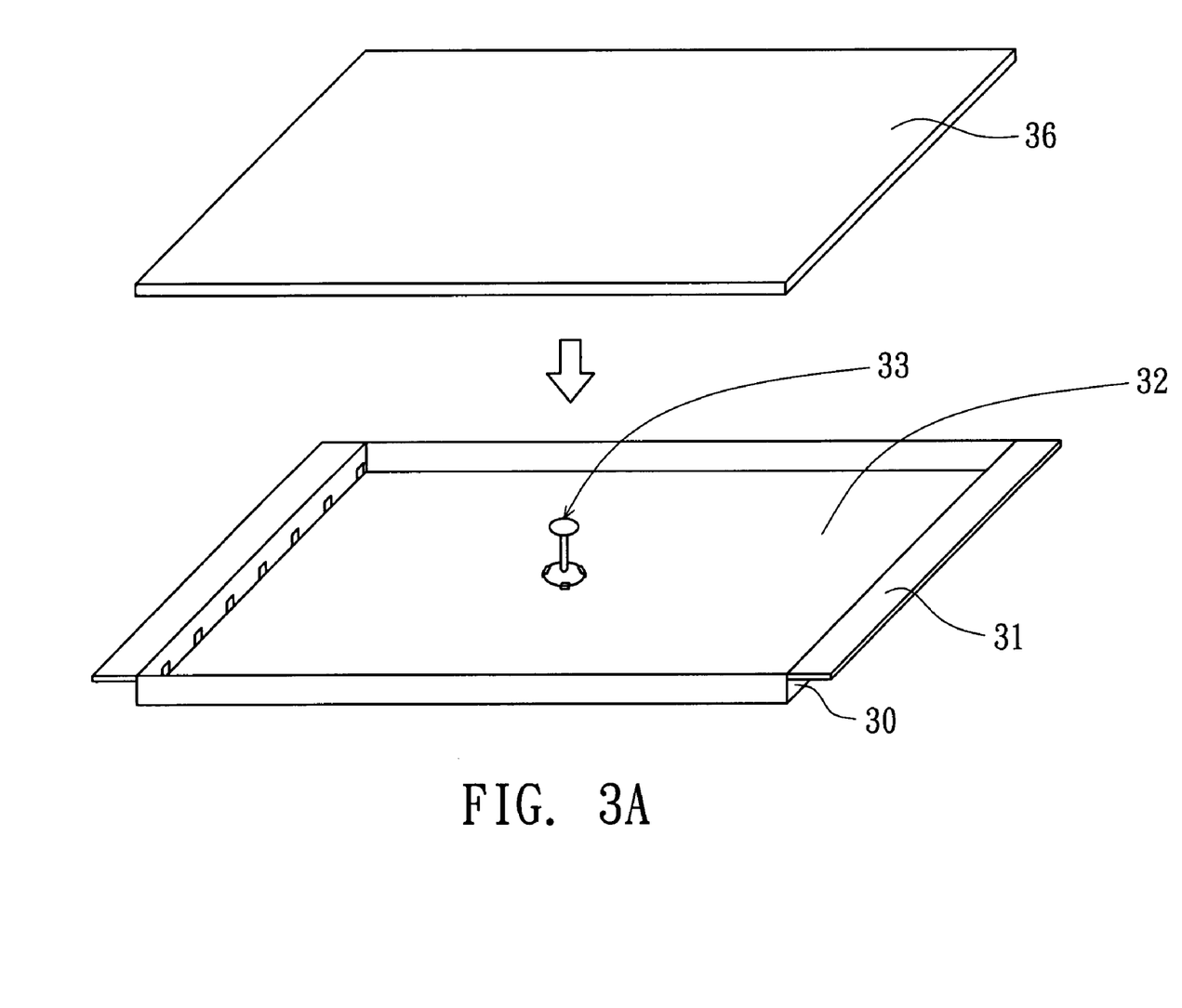
FIG. 3A illustrates a positioning apparatus disposed in the backlight assembly according to the preferred embodiment of the invention.
Figures 3B, 4A:
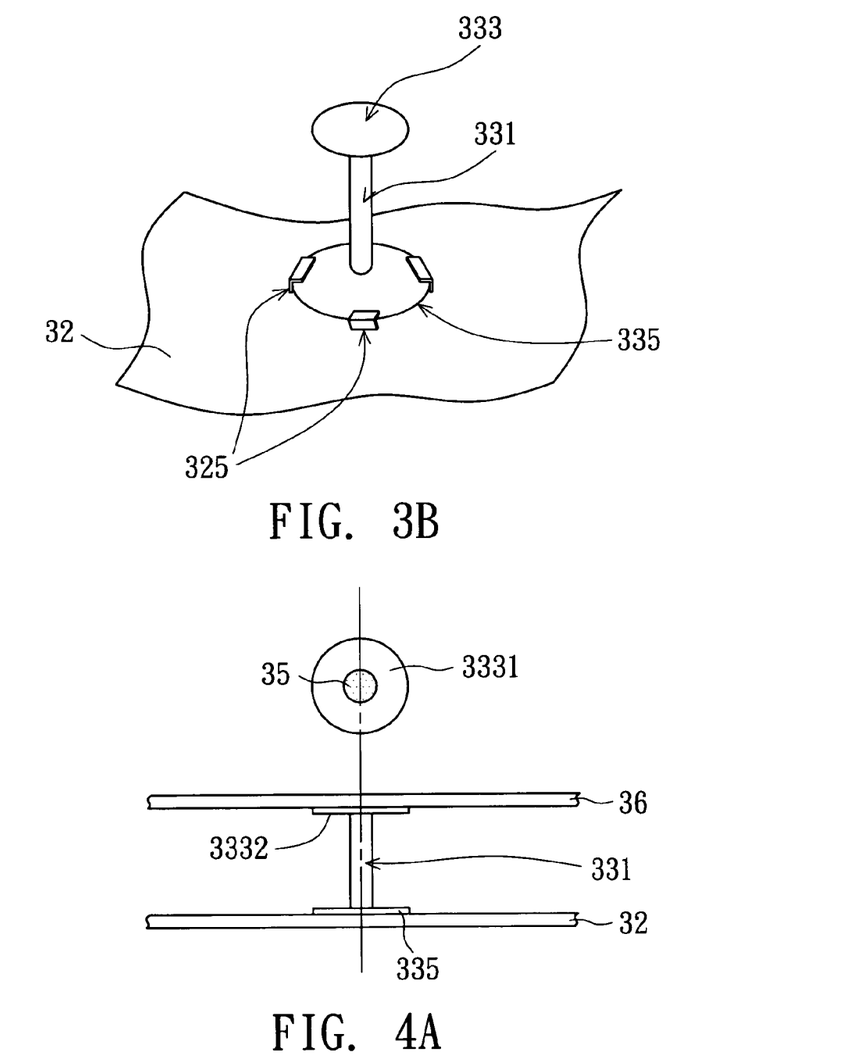
FIG. 3B is an enlarged view of the positioning apparatus of FIG. 3A.
FIG. 4A illustrates the texture machining parts of the supporting object according to the embodiment of the invention.

FIG. 3A illustrates a positioning apparatus disposed in the backlight assembly according to the preferred embodiment of the invention. FIG. 3B is an enlarged view of the positioning apparatus of FIG. 3A. The backlight assembly comprises a housing 30, and the housing 30 has a frame 31 for positioning several backlight components (not shown) of the backlight assembly. A reflective plate 32 is preferably disposed at the bottom of the housing 30. According to the invention, a positioning apparatus is disposed at the housing, for supporting the diffuser plate 36 thereabove. The positioning apparatus comprises a supporting object 33 and an adhesive (not shown). As shown in FIG. 3B, the supporting object 33 has a pillar 331, a sustaining portion 333 and a fixing portion 335. The sustaining portion 333 and the fixing portion 335 are respectively connected to two ends of the pillar 331. The diffuser plate 36 is placed above the sustaining portion 333, and the fixing portion 335 is secured at the bottom surface of the housing 30. For example, several clutching pieces 325 are arranged at the reflective plate 32 for securing the fixing portion 335. The adhesive, such as glue, is added to the sustaining portion 333 of the pillar 33. It is, of course, understood that other fastening means can be used to secure the fixing portion 335.

Accordingly, the positioning apparatus not only support the weight of the diffuser plate 36, but also pull the diffuser plate 36 downward due to the adhesive so that deformation of diffuser plate 36 caused by the thermal and moisture shock can be effectively prevented.

With the positioning apparatus of the invention, the deformation degree of the diffuser plate 36, made of polymethyl methacrylate (PMMA), molybdenum disulfide (MS) or polycarbonate (PC), can be reduced.

In the preferred embodiment, the supporting object 33 is made of transparent PMMA. Also, the shadow of the supporting object 33 can be improved by texture machining the supporting object 33 and modifying the cutting angle of the sustaining portion 333. The related experiments are described below.

Texture Machining Experiments

FIG. 4A illustrates the texture machining parts of the supporting object according to the embodiment of the invention. The sustaining portion 333 and the fixing portion 335 are respectively connected to the ends of the pillar 331 of the supporting object 33. The fixing portion 335 touches the reflective plate 32. The rear surface 3332 of the sustaining portion 333 is directly connected to the pillar 331. The top surface 3331 of the sustaining portion 333 with the adhesive (the gluing area 35) contacts the diffuser plate 36.

Different parts of the supporting object 33 through texture machining are conducted in the experiments. After texture machining, the supporting object 33 is disposed in the backlight assembly, to observe if any shadow appears. The results are listed in Table 1.

TABLE 1

| Parts being texture machining | Top surface 3331 of the sustaining portion 333 | Rear surface 3332 of the sustaining portion 333 | Top surface 3331 and rear surface 3332 | Surface of the pillar 331 |
| --- | --- | --- | --- | --- |
| Shadow Observation | Rounded shadow appears. | Rounded shadow appears. | Rounded shadow appears. | No dot shadow of the pillar 331 appears, but shadow of the cutting line of the sustaining portion 333 appears. |

Figure 4B:
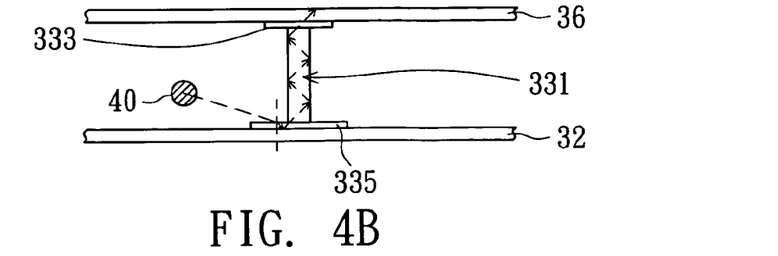
FIG. 4B shows the light path through the supporting object according to the embodiment of the invention.

FIG. 4B shows the light path through the supporting object according to the embodiment of the invention. Refraction is the bending of a light ray as it passes from one medium to another. A light ray passing from an optically less dense medium to an optically denser medium is bent toward the normal (More dense means larger index of refraction n.). As shown in FIG. 4B, the air is an optically less dense medium and the supporting object 33 is an optically denser medium. When the light ray passes from the air into the fixing portion 335 of the supporting object 33, the light ray is internally reflected within the pillar 331 until reaching the sustaining portion 333 and the diffuser plate 36. The way of leading the light ray upward does effectively avoid the shadow of the supporting object 33.

Moreover, in FIG. 4B, the area of the fixing portion 335 is larger than that of the sustaining portion 333, the light emitted from the light source 40 and penetrating the transparent fixing portion 335 is reflected by the reflective plate 32 first and then reflected (up to the sustaining portion 333) within the pillar 331, thereby creating no shadow of the supporting object 33.

The results indicate that the pillar 331 with texture machining does reduce the shadow caused by the backlight irradiation. Also, the transparent fixing portion 335 having larger area than the sustaining portion 333 is another way to reduce the shadow.

Cutting Angle Experiments

The cutting angle experiments are conducted to observe the shadow of the cutting line of the sustaining portion 333. In this experiment, different cutting angles are configured at the edges of the sustaining portion 333 of the supporting object 33, to observe if any shadow appears.

Figure 5A:
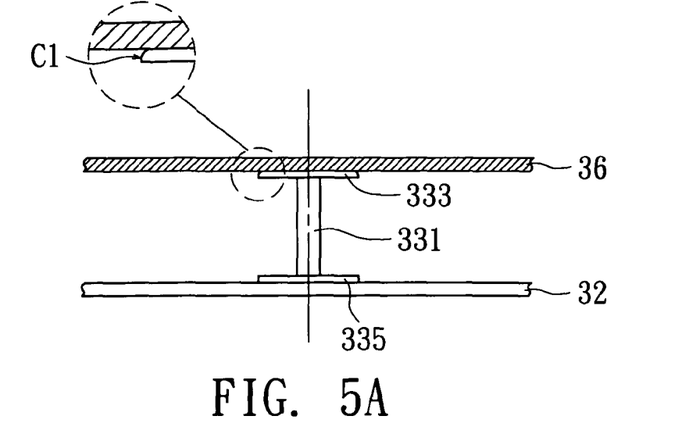
FIG. 5A illustrate the cutting angle C1 configured at the edges of the sustaining portion of the supporting object.

When the edges of the sustaining portion 333 are configured to have the cutting angle C1 (as shown in FIG. 5A), the shadow of the cutting line of the sustaining portion 333 appears.

Figure 5B:
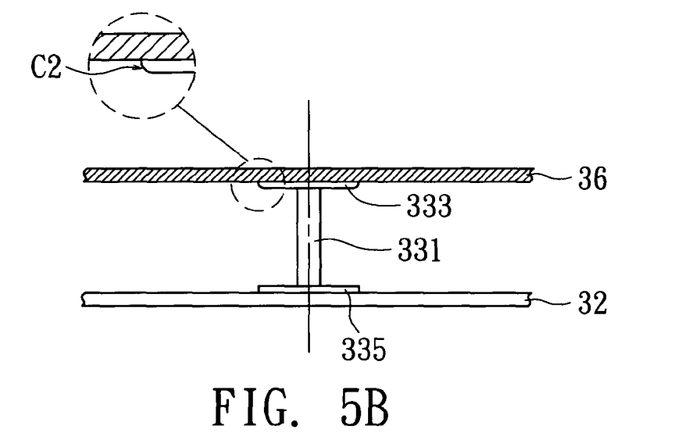
FIG. 5B illustrate the cutting angle C2 configured at the edges of the sustaining portion of the supporting object.

When the edges of the sustaining portion 333 are configured to have the cutting angle C2 (as shown in FIG. 5B), the shadow of the cutting line of the sustaining portion 333 still appears.

Figure 5C:
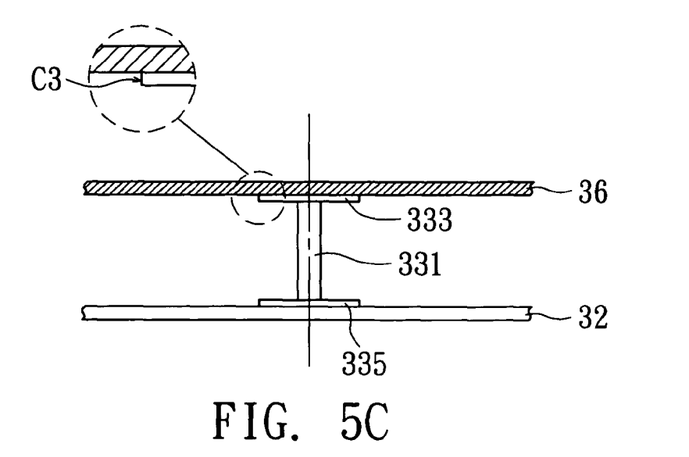
FIG. 5C illustrate the cutting angle C3 configured at the edges of the sustaining portion of the supporting object.

When the edges of the sustaining portion 333 are configured to have the cutting angle C3 (as shown in FIG. 5C), almost no shadow of the cutting line of the sustaining portion 333 appears. Furthermore, after backlight irradiation, the position of the supporting object 33 shows a higher brightness; that can be improved by placing the diffusion sheets over the diffuser plate 36.

Adhesive Selection and Results

I. Two-side adhesive tape: difficult to attach with fine flat (easy to cause air bubbles between the attached plane and the tape), and appearing an uneven chromaticity through the backlight irradiation.

II. Chlorophone: high flow, difficult to control the adequate amount for being the adhesive on the sustaining portion 333, toxic and health hazard.

III. ACM ethyl acrylate: taking long time to solidify (about an hour), time-consuming in the application.

IV. Instant Adhesive (LOCTITE 4860 supplied by LOCTITE Com.): quickly solidify in 3~5 minutes, good transparency, and application well.

According to the experimental results, the supporting object 33 of the positioning apparatus of the invention preferably is made of a transparent material, has a transparent and smooth surface contacting the diffuser plate 36, has a 90 degree cutting angle at the edge of the sustaining portion 333, and proceeds texture machining on the pillar 331 (making a foggy or patterned surface of the pillar 331 for increasing the opportunity for light reflection). Also, instant adhesive (LOCTITE 4860 supplied by LOCTITE Com.) is preferably selected as the adhesive in the embodiment of the invention.

Furthermore, the experiments described below are conducted to measure the deformation of the center of the diffuser plate by a probe-detecting machine. The deformation differences between the inventive backlight assembly with the positioning apparatus and the conventional backlight assembly without the positioning apparatus are revealed in the following experiments.

Deformation of Diffuser Pate with or without Positioning Apparatus

Figure 6:
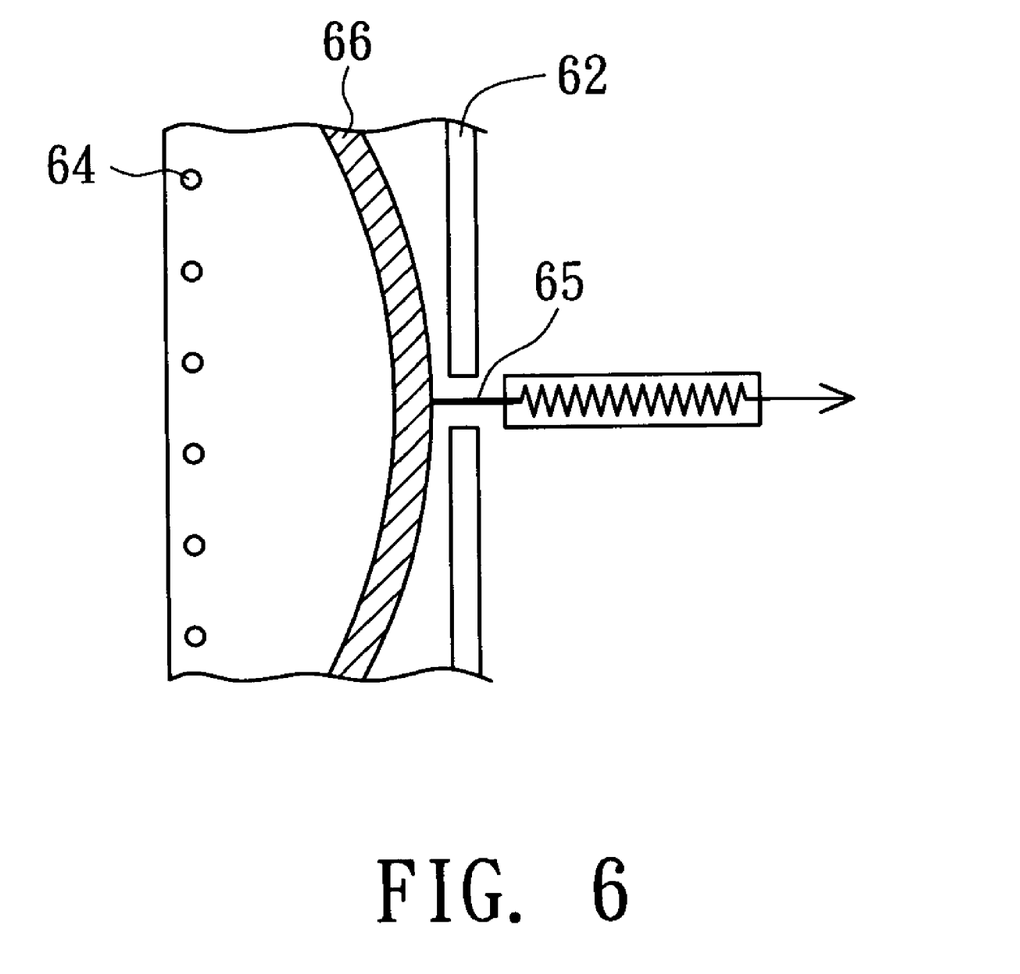
FIG. 6 illustrates the deformation measurement of the diffuser plate according to the preferred embodiment of the invention.

FIG. 6 illustrates the deformation measurement of the diffuser plate according to the preferred embodiment of the invention. In this experiment, a 17" LCD monitor is taken as the test object, and the LCD panel is replaced by a transparent acrylic plate 62. It is easy to drill a hole on the acrylic plate 62, so that the probe 65 can be inserted in the test object for touching the center of the diffuser plate 66. Additionally, a fastening mold is applied in the experiment to fasten the test monitor, thereby preventing the monitor from shaking during the measurement.

During experiments, the diffuser plate 66, made of PMMA or MS, is set in a room at a temperature of 50° C. and 90% humidity to absorb moisture. After moisture-saturated, the diffuser plate 66 is assembled in the test monitor, and then the deformation is observed when the light is on. After the light is on, the scales on the probe 65 are recorded at intervals of couple minutes.

In the measurement, step 1 represents: measuring the deformation (ΔD) of the diffuser plate 66 that is assembled in the test monitor when the light is on. Step 2 represents: after step 1, the light being turned off at least for 12 hours and then the deformation (ΔD) of the diffuser plate 66 being measured, for simulating the real operation of LCD (i.e. the LCD monitor is lighted on in use and lighted off at rest). The results are presented in FIG. 7~FIG. 11.

Figure 7:
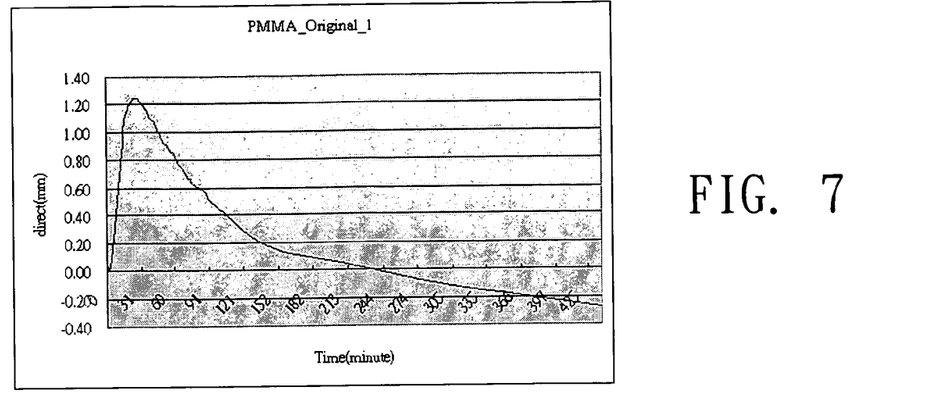
FIG. 7 represents effect of irradiation on the PMMA diffuser plate (step 1) without using the positioning apparatus of the invention.

FIG. 7 represents effect of irradiation on the PMMA diffuser plate (step 1) without using the positioning apparatus of the invention. The result indicates that deformation of about 1.2 mm at the center of the diffuser plate 66 occurs after light on for 30 minutes. Without using the positioning apparatus of the invention, the diffuser plate 66 is dramatically deformed during light-on time.

Figure 8:
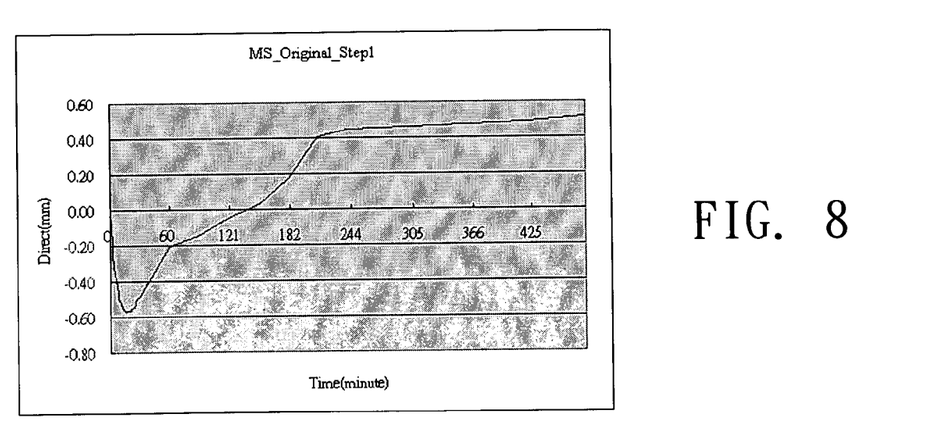
FIG. 8 represents effect of irradiation on the MS diffuser plate (step 1) without using the positioning apparatus of the invention.

FIG. 8 represents effect of irradiation on the MS diffuser plate (step 1) without using the positioning apparatus of the invention. The result indicates that the center of the diffuser plate 66 first deforms toward the position of the light source 64, and then counter-deforms toward the position of the acrylic plate 62 after 2 hours of light on (the particular deforming behavior of MS material). Also, the diffuser plate 66 is dramatically deformed during light-on time without using the positioning apparatus of the invention.

Figure 9:
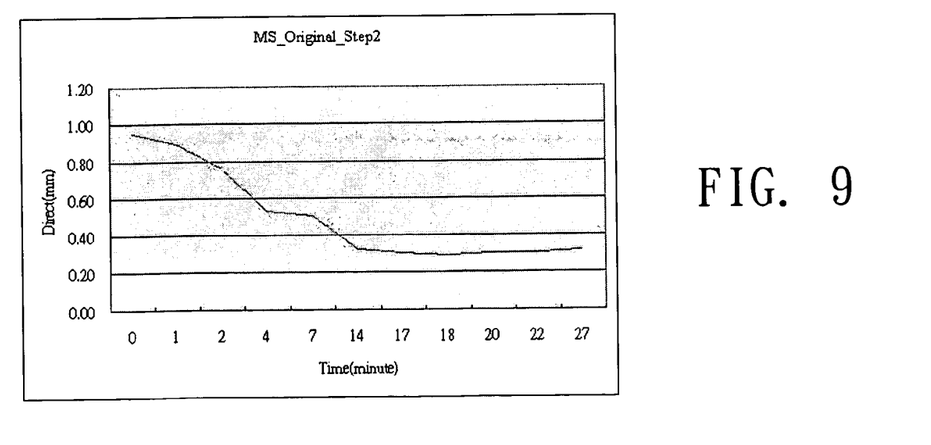
FIG. 9 represents effect of light-off on the MS diffuser plate (step 2) without using the positioning apparatus of the invention.

FIG. 9 represents effect of light-off on the MS diffuser plate (step 2) without using the positioning apparatus of the invention. The result indicates that the deformation of the diffuser plate 66 recovers from about 1.00 mm (initial deformation) to about 0.3 mm after the light is off.

Figure 10:
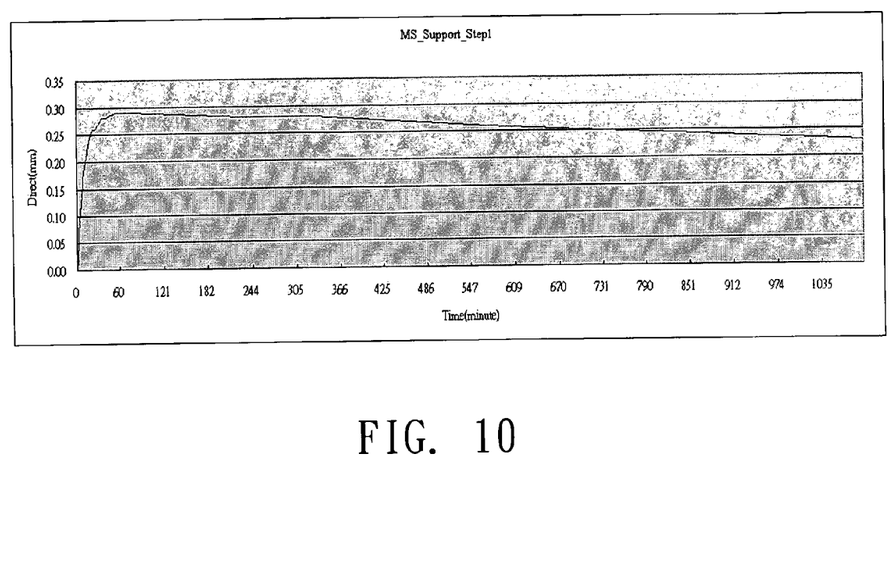
FIG. 10 represents effect of irradiation on the MS diffuser plate (step 1) if applying the positioning apparatus of the invention.

FIG. 10 represents effect of irradiation on the MS diffuser plate (step 1) if applying the positioning apparatus of the invention. The result indicates that the center of the diffuser plate 66 doesn't deform toward the position of the light source 64 due to the existence of the supporting object 33 and the adhesive. Although the diffuser plate 66 absorbs the moisture after 30 minutes of light-on time, the deformation of the diffuser plate 66 is less than 0.3 mm. Also, with the positioning apparatus of the invention, the deformation of the diffuser plate 66 can be controlled in a range of 0.3 mm to 0.2 mm, even the light-on time is extended to 1035 minutes (about 17.25 hours).

Figure 11:
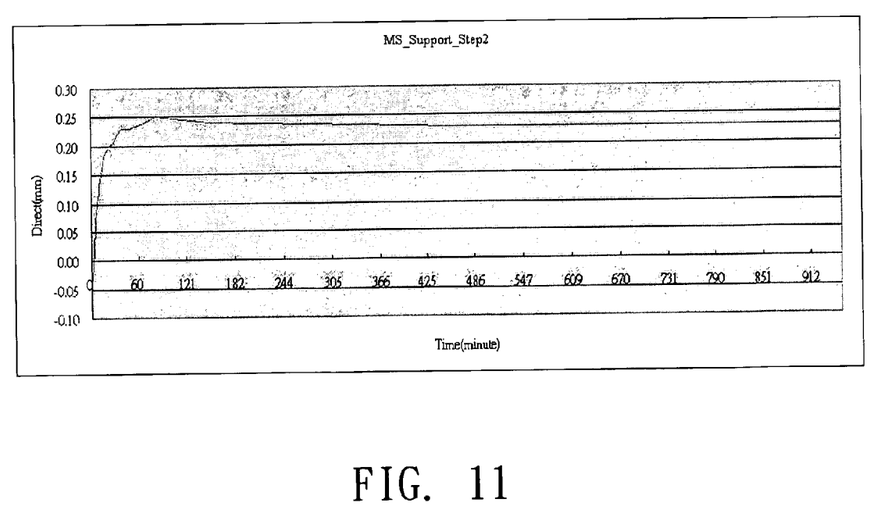
FIG. 11 represents effect of light-off on the MS diffuser plate (step 2) if applying the positioning apparatus of the invention.

FIG. 11 represents effect of light-off on the MS diffuser plate (step 2) if applying the positioning apparatus of the invention. The result indicates that the deformation of the diffuser plate 66 is maintained in a range of 0.25 mm to 0.2 mm after the light is off.

According to the experimental results, it is proved that the diffuser plate can be controlled to deform in a small range with the application of the positioning apparatus of the invention, thereby reducing the overall thickness of the LCD.

In the aforementioned description, only one set of the positioning apparatus is taken for illustration in the embodiment, but the invention is not limited herein. It is, of course, understood that two or more sets of the positioning apparatus could be applied in the backlight assembly for reducing the deformation of the diffuser plate. Also, selection of the adhesive and the appearance of the supporting object 33 are not limited herein. Moreover, the supporting object 33 could be fixed by other fastening means, not limited by means of the clutching pieces 325.

While the invention has been described by way of examples and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A positioning apparatus, disposed in a backlight assembly having a diffuser plate, the positioning apparatus comprising:
   a supporting object, comprising a pillar,
   a cylindrical sustaining portion disposed at a first end of the pillar and having edges with a 90-degree cutting angle to increase the brightness of light emitted from the backlight assembly to the diffuser plate through the supporting object, relative to light emitted from the backlight assembly directly to the diffuser plate, and having a circumference greater than that of the pillar; and
   a cylindrical fixing portion disposed at a second end of the pillar opposite to the first end of the pillar, and having a circumference greater than that of the pillar, wherein either a top surface area or a rear surface area of the cylindrical fixing portion is larger than either a top surface area or a rear surface area of the cylindrical sustaining portion; and
   an adhesive, added on a top of the sustaining portion of the supporting object for pulling the diffuser plate,
   wherein texture machining is performed on the pillar of the supporting object to reflect light coming into the pillar up to the sustaining portion.

2. The positioning apparatus according to claim 1, wherein the backlight assembly has a housing, the housing has a reflective bottom surface and a plurality of light sources, the fixing portion is fastened at the reflective bottom surface.

3. The positioning apparatus according to claim 2, wherein a plurality of clutching pieces are arranged at the reflective bottom surface for securing the fixing portion.

4. The positioning apparatus according to claim 1, wherein the supporting object is made of transparent material.

5. The positioning apparatus according to claim 4, wherein the supporting object is made of polymethyl methacrylate (PMMA).

6. The positioning apparatus according to claim 4, wherein the pillar of the supporting object has a patterned surface.

7. The positioning apparatus according to claim 1, wherein the supporting object is formed by injection molding and integrated as a whole.

8. The positioning apparatus according to claim 1, wherein the sustaining portion is a transparent and smooth surface.

9. The positioning apparatus according to claim 1, wherein the cylindrical sustaining portion and the cylindrical fixing portion are each disc-shaped.

10. A display device, at least comprising:
    a display panel;
    a backlight assembly including a housing for positioning several backlight components of the backlight assembly and having a frame, and a diffuser plate disposed on the frame;
    a positioning apparatus disposed on the housing of the backlight assembly, for reducing deformation of the diffuser plate and including a supporting object, the supporting object including
    a pillar,
    a cylindrical supporting object disposed at a first end of the pillar and below the diffuser plate, and having a circumference greater than that of the pillar, and
    a cylindrical fixing portion disposed at a second end of the pillar opposite to the first end of the pillar, having a circumference greater than that of the pillar, and an area of the fixing portion being greater than an area of the sustaining portion to increase the brightness of light emitted from the backlight assembly to the diffuser plate through the supporting object, relative to light emitted from the backlight assembly directly to the diffuser plate, wherein either a top surface area or a rear surface area of the cylindrical fixing portion is larger than either a top surface area or a rear surface area of the cylindrical sustaining portion; and
    an adhesive, added on a top of the sustaining portion of the supporting object for pulling the diffuser plate,
    wherein texture machining is performed on the pillar of the supporting object to reflect light coming into the pillar up to the sustaining portion.

11. The display device according to claim 10, wherein the housing has a reflective bottom surface, and the fixing portion is fastened at the reflective bottom surface.

12. The display device according to claim 11, wherein a plurality of clutching pieces are arranged at the reflective bottom surface for securing the fixing portion.

13. The display device according to claim 10, wherein the supporting object is made of transparent material.

14. The display device according to claim 10, wherein the supporting object is made of polymethyl methacrylate (PMMA).

15. The display device according to claim 10, wherein the pillar of the supporting object has a patterned surface.

16. The display device according to claim 10, wherein the supporting object is formed by injection molding and integrated as a whole.

17. The display device according to claim 10, wherein the sustaining portion is a transparent and smooth surface.

18. A positioning apparatus, disposed in a backlight assembly having a diffuser plate, the positioning apparatus comprising:
   a supporting object including
      a pillar having a patterned surface,
      a cylindrical sustaining portion disposed at a first end of the pillar and below the diffuser plate, and having a circumference greater than that of the pillar; and
      a cylindrical fixing portion disposed at a second end of the pillar opposite to the first end, and having a circumference greater than that of the pillar, wherein either a top surface area or a rear surface area of the cylindrical fixing portion is larger than either a top surface area or a rear surface area of the cylindrical sustaining portion,
      the patterned surface for reflecting light coming into the pillar up to the sustaining portion, and an area of the fixing portion being greater than an area of the sustaining portion to increase the brightness of light emitted from the backlight assembly to the diffuser plate through the supporting object, relative to light emitted from the backlight assembly directly to the diffuser plate; and
   an adhesive, added on a top of the sustaining portion of the supporting object for pulling the diffuser plate.

19. The positioning apparatus according to claim 18, wherein the backlight assembly has a housing, the housing has a reflective bottom surface and a plurality of light sources, the fixing portion is fastened at the reflective bottom surface.

20. The positioning apparatus according to claim 19, wherein a plurality of clutching pieces are arranged at the reflective bottom surface for securing the fixing portion.

21. The positioning apparatus according to claim 18, wherein the supporting object is made of transparent material.

22. The positioning apparatus according to claim 21, wherein the supporting object is made of polymethyl methacrylate (PMMA).

23. The positioning apparatus according to claim 18, wherein the supporting object is formed by injection molding and integrated as a whole.

24. The positioning apparatus according to claim 18, wherein the sustaining portion is a transparent and smooth surface.

* * * * *